July 24, 1962  L. H. SPENCER ETAL  3,045,495
LIQUID MEASURING CONTAINER
Filed Oct. 26, 1959
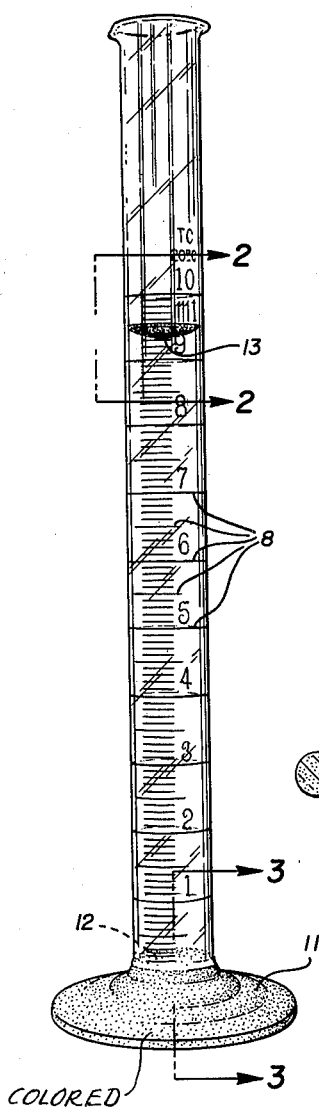
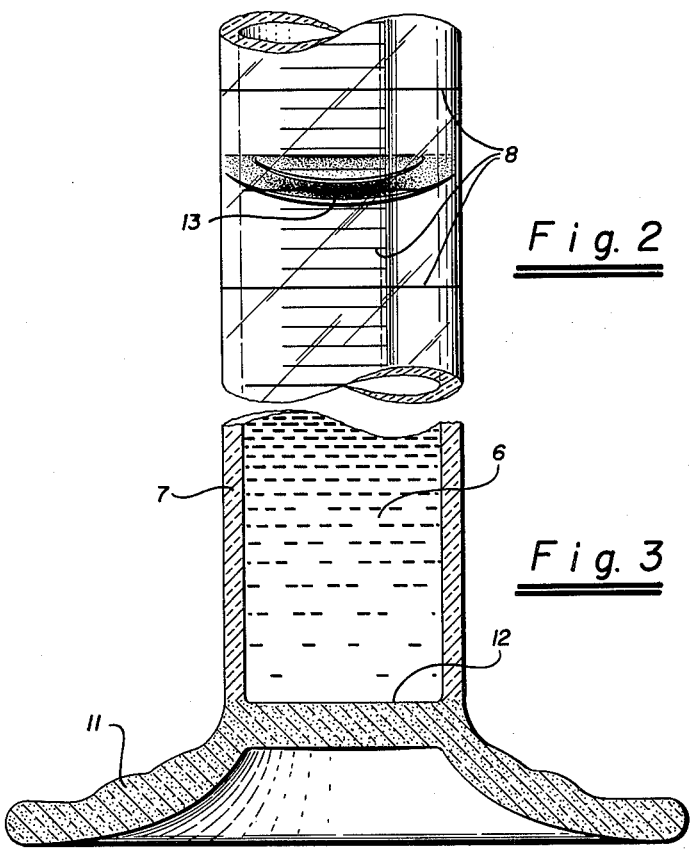
INVENTORS
Leland H. Spencer
Roland D. Asher
BY
Their Attorney

United States Patent Office 3,045,495
Patented July 24, 1962

3,045,495
LIQUID MEASURING CONTAINER
Leland H. Spencer, 2 Requa Place, Piedmont, Calif., and Ronald D. Asher, 317 Hanover St., Oakland, Calif., assignors of twenty-five percent to Sidney Davis, Oakland, Calif.
Filed Oct. 26, 1959, Ser. No. 848,602
2 Claims. (Cl. 73—427)

This invention relates to containers for measuring liquids such as chemists' graduates, and the like.

Accurate reading of the top liquid level meniscus of a relatively clear liquid in a clear glass measuring container or graduate is sometimes difficult due to lack of light contrast between the liquid and the graduations on the container and constant work in this field may induce eye strain and fatigue as well as inaccuracies in measurements.

An object of the present invention is to provide a liquid measuring container of the character described in which the top meniscus of the liquid is caused to be illuminated as a sharp colored line in clear contrast to and for easy reading against the graduations on the side of the vessel.

Another object of the present invention is to provide a liquid measuring container of the character above which may be manufactured from commonly used and accepted materials and without significantly increasing cost.

The invention possesses other objects and features of advantage, some of which of the foregoing will be set forth in the following description of the preferred form of the invention which is illustrated in the drawing accompanying and forming part of this specification. It is to be understood however, that variations in the showing made by the said drawing and description may be adopted within the scope of the invention as set forth in the claims.

Referring to said drawing (one sheet):

FIGURE 1 is a side elevation of a chemists' graduate constructed in accordance with the present invention.

FIGURE 2 is an enlarged fragmentary elevation partly in section of the graduate taken at the portion thereof indicated by lines 2—2 of FIGURE 1.

FIGURE 3 is a fragmentary enlarged cross-sectional view taken substantially on the plane of line 3—3 of FIGURE 1.

The liquid measuring container of the present invention may take on any of the variously accepted forms of liquid measuring containers or graduates and includes an interior liquid chamber 6 formed in part by a transparent side wall 7 having graduations 8 thereon for measuring the height of liquid within the chamber; and an integral colored base 11 which defines the bottom 12 of chamber 6 and functions to cast a sharp colored top surface or line 13 at the top meniscus of the liquid in contrast to and for easy reading against the graduations 8.

In the form of the device illustrated in the drawing, the container is shown as a chemist's graduate of more or less commonly accepted form, this being one of the most useful applications of the present invention. The graduate may be formed entirely of glass or plastic providing the transparent side wall 7 of the integral colored base 11. Conveniently the graduate may be manufactured by joining a tubular piece defining the side wall 7 with a pre-formed base 11, the latter may be formed of colored glass with the coloration translucent or opaque, it being desirable, however, that the colored base come into intimate contact with the liquid 6 so as to get a maximum flow of colored light through the liquid and to the meniscus 13. Colored light is thought to be largely reflected from the base 11 up through the liquid although light may also be transmitted through the base to emerge colored for transmission up through the liquid. Experience demonstrates that both translucent and opaque colored bases function to provide the meniscus colored phenomena of the present invention. Preferably a strong color is used in the base such as red or blue. The colored light emanating from the base is transmitted up through the liquid without affecting the color of the liquid itself but is dispersed at the meniscus to provide the strongly colored and sharp reading line above described.

We claim:

1. A liquid measuring container comprising an elongated clear transparent glass tube having a plurality of graduations marked thereon at different heights and extending laterally around said tube to accurately read the quantity of liquid contained in said tube by observing the top meniscus of the liquid, the lower end of said tube terminating in a radially outwardly extending portion forming an enlarged circular base, said base portion being formed integral with said tube, and at least the bottom portion of said tube inwardly of said radially outwardly extending portion being of transparent colored glass for indicating a sharp meniscus line.

2. A liquid measuring container comprising an elongated clear transparent glass tube having a plurality of graduations marked thereon and extending laterally around said tube to accurately read the quantity of liquid contained in said tube by observing the top meniscus of the liquid, the lower end of said tube terminating in a radially outwardly extending portion forming an enlarged circular base, said base portion being formed integral with said tube and being of transparent colored glass for indicating a sharp meniscus line.

References Cited in the file of this patent
UNITED STATES PATENTS

| 272,713 | Leake | Feb. 20, 1883 |
| 1,870,363 | Jenkins | Aug. 9, 1932 |

FOREIGN PATENTS

| 197,538 | Great Britain | May 17, 1923 |
| 291,676 | Great Britain | June 7, 1923 |